US006109576A

United States Patent [19]

Szewczyk

[11] Patent Number: 6,109,576

[45] Date of Patent: Aug. 29, 2000

[54] TRANSMISSION BRAKE RELEASE SWITCH MOUNT

[76] Inventor: Daniel David Szewczyk, 119 North Seine Dr., Cheektowaga, N.Y. 14227

[21] Appl. No.: 09/257,727

[22] Filed: Mar. 2, 1999

[51] Int. Cl.[7] .......... F16M 11/00

[52] U.S. Cl. .......... 248/200; 248/694

[58] Field of Search .......... 248/200, 118, 248/118.1, 694

[56] References Cited

U.S. PATENT DOCUMENTS 4,332,263 6/1982 Kitrell .......... 248/118 X
4,915,331 4/1990 Becker et al. .......... 248/118

*Primary Examiner*—Ramon O. Ramirez

[57] ABSTRACT

My Transmission Brake Release Switch Mount allows a Drag Race Car Driver to place his thumb or finger on the brake release switch in the same position each race. The driver can do this without looking. This will improve the consistency of the driver's reaction time, resulting in more races won.

1 Claim, 4 Drawing Sheets

TRANSMISSION BRAKE RELEASE SWITCH MOUNT

CROSS REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

BACKGROUND OF INVENTION

My invention pertains to the sport of Drag Racing. It is designed to greatly improve the consistency of a driver's reaction time.

Reaction time is the "period of time" in a Drag Race when the green (GO) light comes on, to when the race car crosses the finish line.

This is controlled by the driver seeing the green light and releasing his thumb or finger from an Electronic Transmission Brake Release Switch.

The positioning of the driver's thumb or finger on the switch cannot be seen while the driver is staging the race car at the starting line.

Therefore, his thumb or finger is placed on the switch in a different position each race. This causes the switch to be released differently each time, making the reaction time very different with each race. Reaction times are clocked down to 0.001 of a second. Most Drag Races are won by the driver's ability to control his reaction time.

BRIEF SUMMARY OF THE INVENTION

My invention is an adjustable Mounting Device for an Electronic Transmission Brake Release Switch.

My invention allows the driver of a Drag Race Car to place his thumb or finger on the Electronic Transmission Brake Release Switch in the same position for each race, without looking at his thumb or finger. This will make the driver's reaction time much more consistent.

The thumb or finger block may also be mounted through any panel without part number 2 (the mounting bracket).

Figure 1:
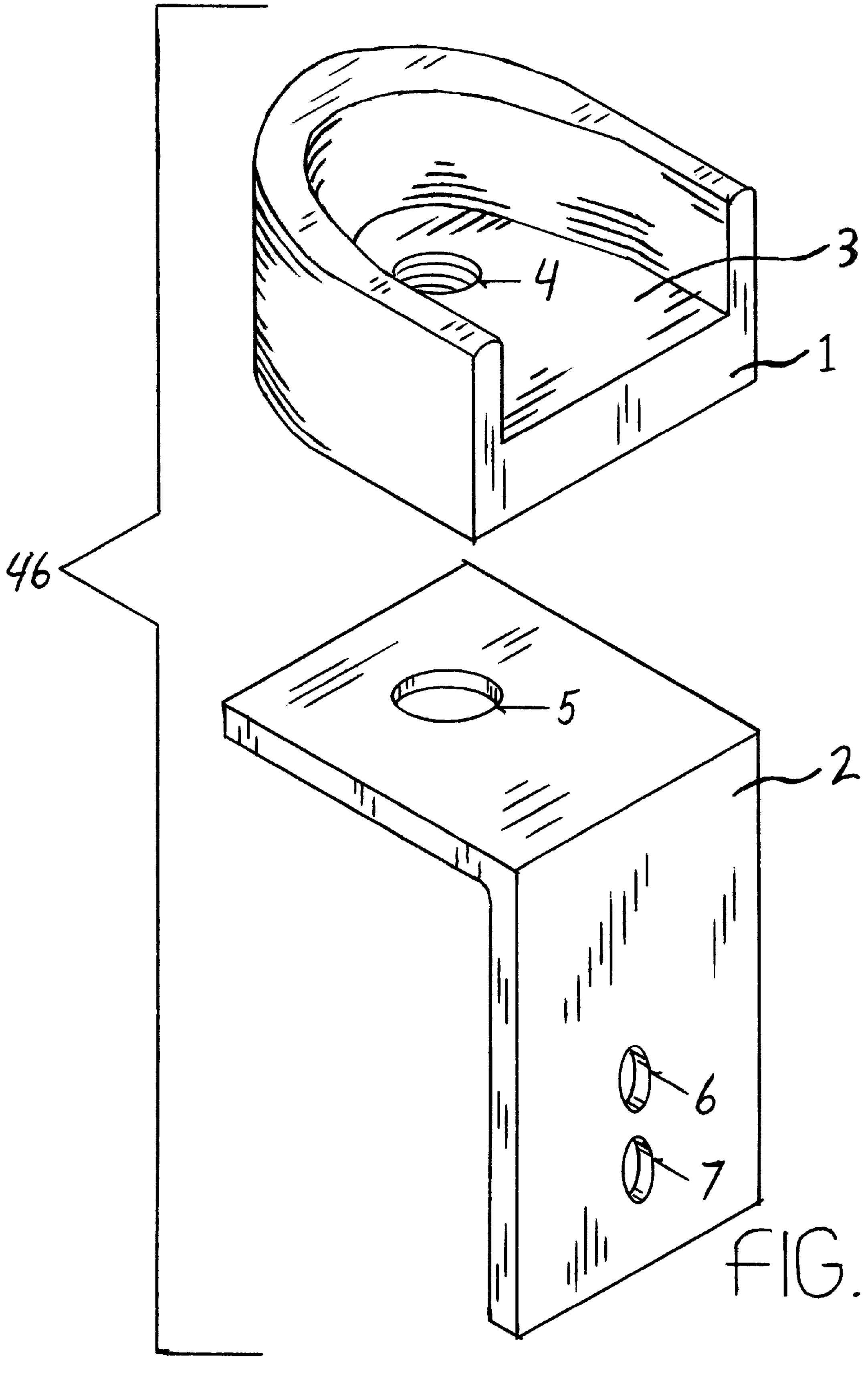
FIG. 1 is an exploded view of the two pieces that make up the Transmission Brake Switch Mount. Part number 1 is the thumb or finger block. Part number 2 is the mounting bracket.
Figure 2:
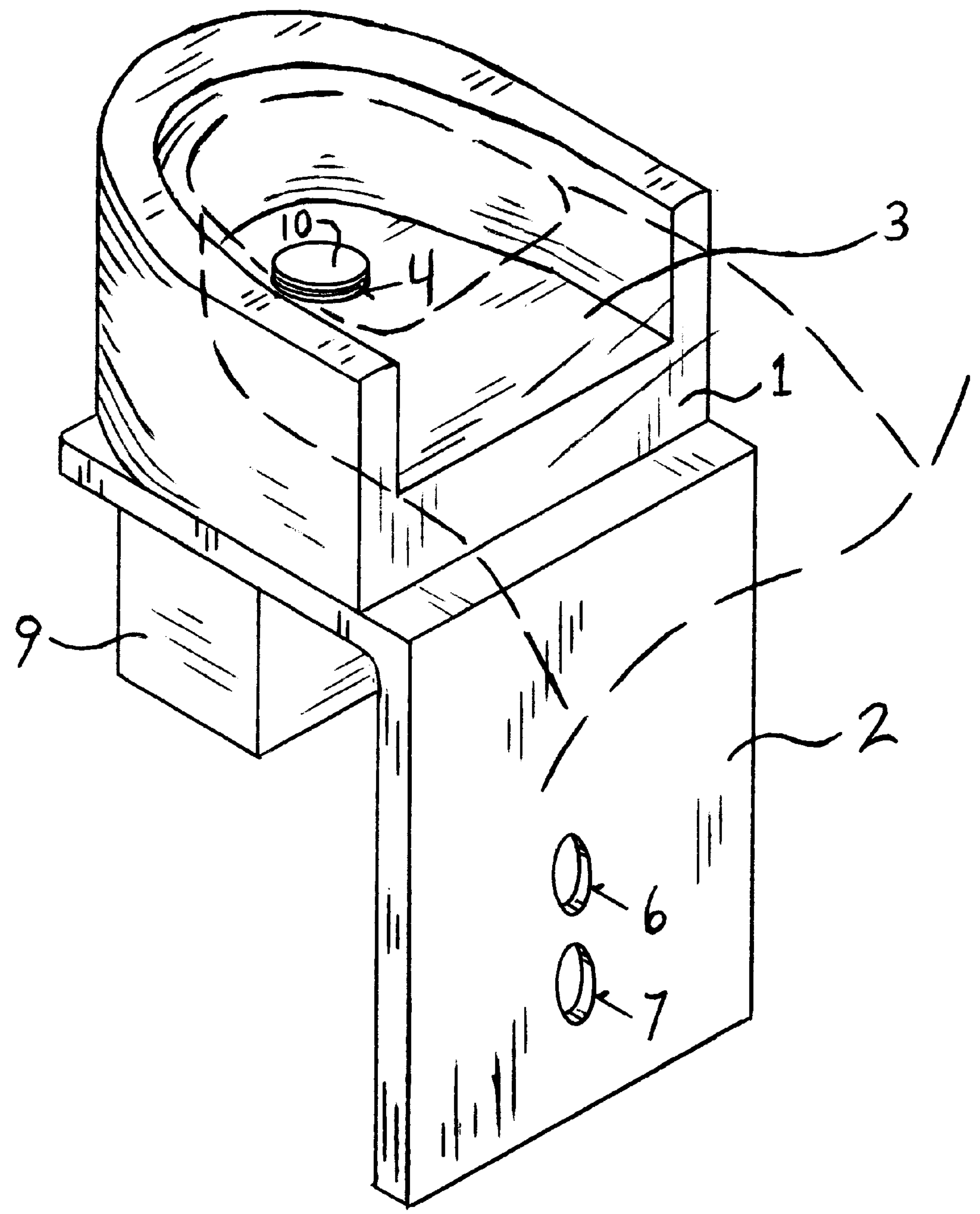
FIG. 2 is a perspective view of the same two parts as shown in FIG. 1, but they are assembled together with an Electronic Transmission Brake Switch (as shown in FIG. 4). part number 2 can be rotated 360°. This allows the thumb or finger block to be installed in any position.
Figure 3:
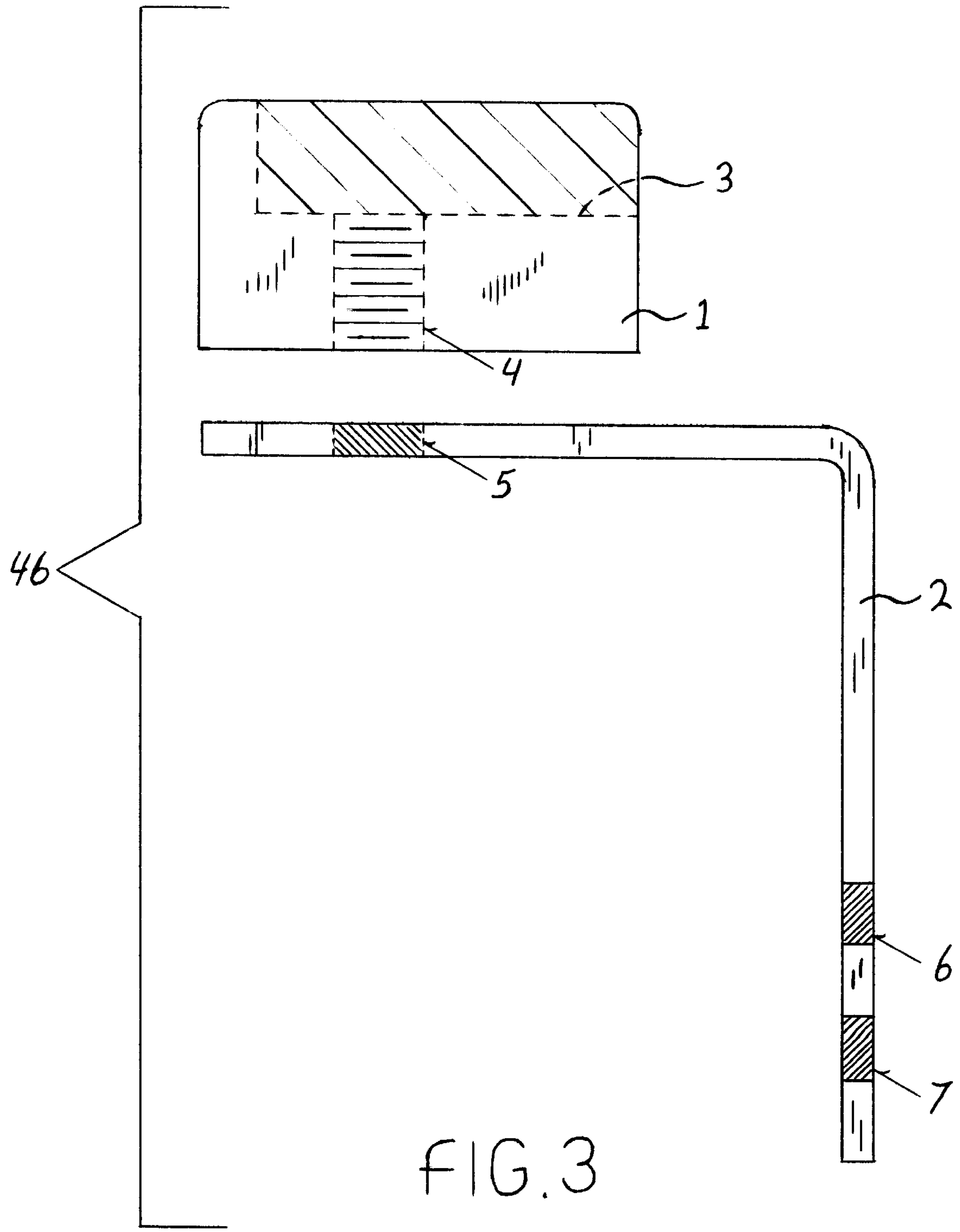

FIG. 3 is a side view of the same two parts as shown in FIG. 1.

Figure 4:
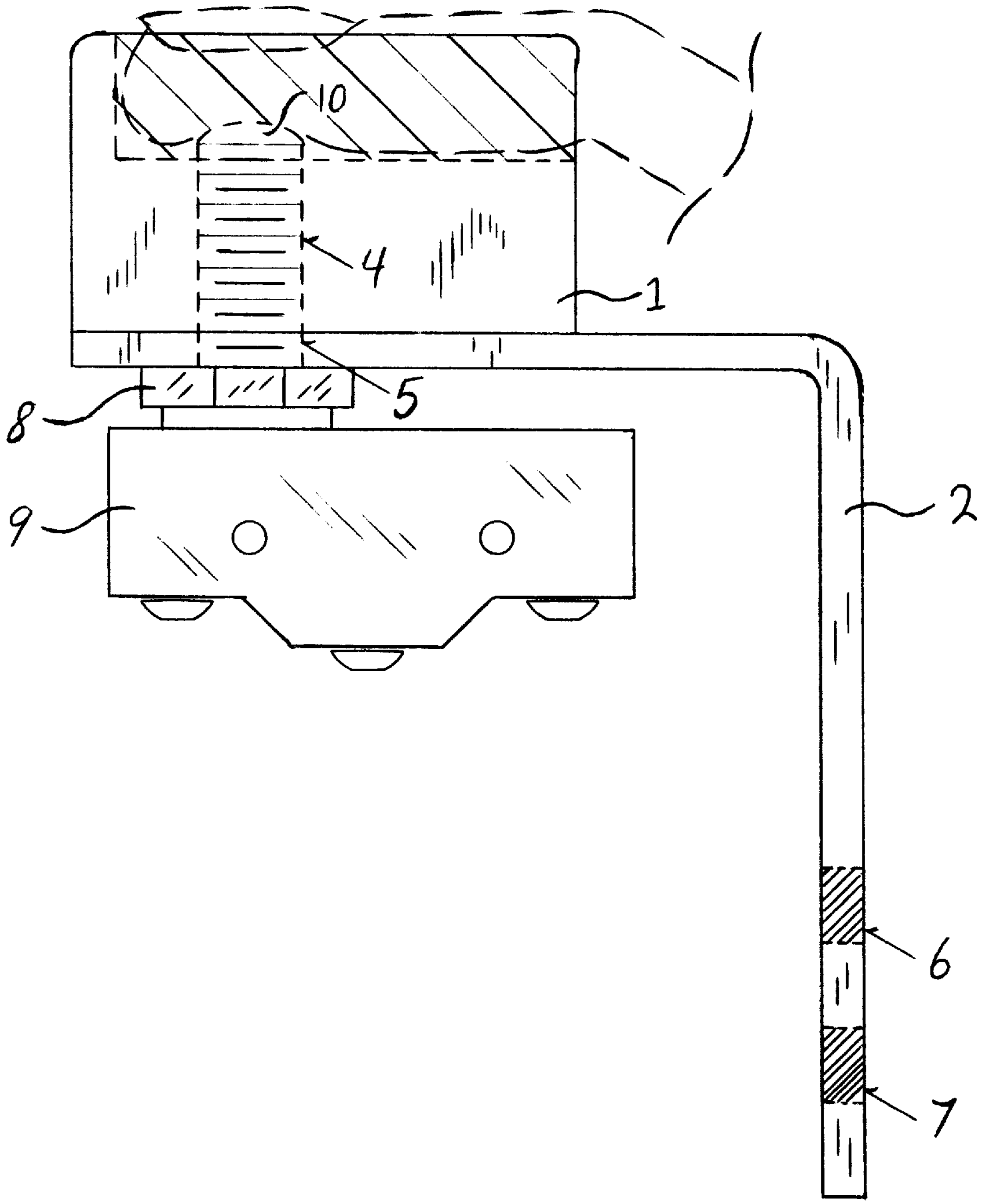

FIG. 4 is a side view of the same two parts as shown in FIG. 3, but assembled together with an Electronic Brake Release Switch.

DETAILED DESCRIPTION OF THE INVENTION

Referring to part number 1 in FIG. 1, this is the thumb or finger block. This is machined from a block of aluminum. A saddle 3 is milled out so that a thumb or finger can be placed into it. This saddle 3 will be milled in two sizes; one to fit an average thumb and one to fit an average finger. Then there is a hole 4 drilled in the center of the saddle 3. This hole 4 is then tapped out so that the Electronic Transmission Brake Release Switch 9 can be screwed through the block 1 into the bottom of the saddle 3 (as shown in FIG. 4).

Referring to part number 2, in FIG. 1, this is a L shaped bracket cut from 90° angled aluminum. One side of this bracket has two small holes 6 and 7 drilled to secure the device to the vehicle. The other side of the bracket has a hole 5 drilled to secure it to part number 1 (as shown in FIG. 4).

Referring to FIG. 4., The L Bracket 2 is secured to the thumb or finger block 1 by putting the threaded release switch 9 through the hole 5, screwing the release switch 9 into the threaded hole 4 of the thumb or finger block 1 and then tightening the locknut 8. The height of the button portion 10 showing through the saddle area 3 can be adjusted by loosening the locknut 8 and rotating the Release Switch Assembly 9.

The Transmission Brake Release Switch Mount 46 should be mounted where the thumb or finger being used, can easily be put into the saddle 3. Insert the thumb or finger into the saddle 3 all the way then depress the button 10. The release of the button 10 will be much more consistent because the position of the thumb or finger on the button 10 is more consistent.

What I claim as my invention is a Transmission Brake Release Switch Bracket:

1. A device for positioning a drag racer thumb or finger onto a button type switch, like an electronic transmission brake release switch, for improving the consistency of the operation of the switch, the device comprising:

- a thumb or finger block receiving portion defined by a tapered base portion and a wall surrounding three sides of said base, and an opening on said base adapted to receive said button switch; and
- a bracket portion defined by two legs, having one opening on one of the legs for securing it to the thumb or finger block receiving portion, and two openings on the other leg for securing the bracket portion to a vehicle.

* * * * *